(12) United States Patent
Bhat et al.

(10) Patent No.: US 11,886,231 B2
(45) Date of Patent: *Jan. 30, 2024

(54) FUNCTIONS FOR PATH TRAVERSALS FROM SEED INPUT TO OUTPUT

(71) Applicant: Palantir Technologies Inc., Denver, CO (US)

(72) Inventors: Meghana Bhat, New York, NY (US); Bryan Williams, Stanford, CA (US); Eric Anderson, Washington, DC (US); Brendan Berg, Seattle, WA (US); Alex De La Mare, Churton Park (NZ); Christopher Cook, Plimmerton (NZ); Daniel Sperling, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,246

(22) Filed: Jun. 14, 2022

(65) Prior Publication Data

US 2022/0309065 A1 Sep. 29, 2022

Related U.S. Application Data

(63) Continuation of application No. 16/709,835, filed on Dec. 10, 2019, now Pat. No. 11,392,585.

(60) Provisional application No. 62/906,614, filed on Sep. 26, 2019.

(51) Int. Cl.
*G06F 16/24* (2019.01)
*G06F 16/2453* (2019.01)

(52) U.S. Cl.
CPC .. *G06F 16/24542* (2019.01); *G06F 16/24537* (2019.01)

(58) Field of Classification Search
CPC ............... G06F 16/24542; G06F 16/24537
See application file for complete search history.

(56) References Cited

U.S. PATENT DOCUMENTS

| | | | |
|---|---|---|---|
| 6,262,984 B1 * | 7/2001 | Rochberger | H04L 45/02 370/395.2 |
| 10,445,061 B1 * | 10/2019 | Cao | G06F 16/951 |
| 2010/0198845 A1 | 8/2010 | Kutsch et al. | |
| 2011/0302198 A1 | 12/2011 | Baby et al. | |
| 2013/0246435 A1 * | 9/2013 | Yan | G06F 16/355 707/E17.046 |
| 2014/0122428 A1 | 5/2014 | Zhou et al. | |

(Continued)

FOREIGN PATENT DOCUMENTS

WO 20110151500 A1 12/2011

*Primary Examiner* — Mohammad S Rostami
(74) *Attorney, Agent, or Firm* — Sheppard Mullin Richter & Hampton LLP

(57) ABSTRACT

Described herein are systems, methods, and non-transitory computer readable media for defining and executing functions for determining a matching entity that is relevant to an entity of interest when, for example, there is a significant number of intermediary links and entities between the matching entity and the entity of interest. A visual depiction of a path traversal from a seed input entity to an output matched entity can be presented to an end user in a manner that allows the end user to ascertain the sequence of intermediary links and entities that connect the matched entity to the seed entity.

19 Claims, 5 Drawing Sheets

(56) References Cited

U.S. PATENT DOCUMENTS

| | | | |
|---|---|---|---|
| 2015/0254309 A1* | 9/2015 | Sekiguchi | G06F 9/44 |
| | | | 707/752 |
| 2015/0347436 A1 | 12/2015 | Hiwale et al. | |
| 2016/0004710 A1 | 1/2016 | Sekiguchi et al. | |
| 2016/0314153 A1* | 10/2016 | Murata | G06F 12/06 |
| 2018/0247016 A1 | 8/2018 | Semenyuk | |
| 2018/0267777 A1* | 9/2018 | Shack | G06F 8/38 |
| 2018/0300361 A1* | 10/2018 | Ben-Aharon | G06F 40/143 |
| 2018/0322198 A1* | 11/2018 | Elkherj | G06F 16/951 |
| 2019/0005023 A1 | 1/2019 | Olsen et al. | |
| 2019/0108285 A1 | 4/2019 | Stillwell, Jr. et al. | |
| 2019/0236187 A1* | 8/2019 | Fitchett | G06F 16/9024 |
| 2019/0340294 A1* | 11/2019 | Spangler | G06F 16/36 |
| 2020/0076834 A1 | 3/2020 | Ladnai et al. | |
| 2020/0195427 A1 | 6/2020 | Beck et al. | |
| 2020/0226512 A1 | 7/2020 | Epstein et al. | |
| 2020/0257732 A1 | 8/2020 | Oh et al. | |
| 2020/0285643 A1* | 9/2020 | Kadiam | G06F 16/24542 |
| 2020/0382359 A1* | 12/2020 | Rao | G06F 40/284 |
| 2020/0401908 A1* | 12/2020 | Ortega | G06V 10/762 |
| 2022/0327280 A1* | 10/2022 | Dai | G06F 40/284 |

* cited by examiner

FUNCTIONS FOR PATH TRAVERSALS FROM SEED INPUT TO OUTPUT

CROSS REFERENCE TO RELATED APPLICATIONS

This application is a continuation of U.S. application Ser. No. 16/709,835, filed Dec. 10, 2019, which claims the benefit under 35 U.S.C. § 119(e) of U.S. Provisional Application No. 62/906,614 filed Sep. 26, 2019, the content of which is incorporated by reference in its entirety into the present disclosure.

TECHNICAL FIELD

The present invention relates generally to approaches for determining a matching entity that is relevant to an entity of interest, and more specifically, to approaches for determining a relevant matching entity for a seed entity regardless of the number of intermediary links and entities there between.

BACKGROUND

Various searching algorithms and approaches are known for identifying entities of interest. Conventional searching algorithms and techniques, however, suffer from a number of technical drawbacks including, for example, the inability to determine connection(s) between two entities and/or effectively use such connections to determine search results.

SUMMARY

Described herein are systems, methods, and non-transitory computer readable media for defining and executing functions for determining a matching entity that is relevant to an entity of interest when, for example, there is a significant number of intermediary links and entities between the matching entity and the entity of interest. In addition, described herein are systems, methods, and non-transitory computer readable media for illustrating or otherwise conveying a path traversal from a seed input entity to an output matched entity to an end user in a manner that allows the end user to ascertain the sequence of intermediary links and entities that connect the matched entity to the seed entity.

In an example embodiment, a method includes identifying a seed entity and executing a function on the seed entity to determine a matching entity linked to the seed entity. In an example embodiment, determining the matching entity includes determining one or more intermediary entities that satisfy one or more criteria associated with the function and determining a traversal path from the seed entity to the matching entity that includes one or more intermediary links that connect the seed entity to the matching entity via the one or more intermediary entities.

In an example embodiment, a system is provided that is configured to implement the above-described method. The system includes at least one processor and at least one memory storing computer-executable instructions. The at least one processor is configured to access the at least one memory and execute the computer-executable instructions to perform the above-described method. In addition, in an example embodiment, a computer program product is provided. The computer program product includes a non-transitory computer readable medium that is readable by a processing circuit and that stores instructions executable by the processing circuit to cause the above-described method to be performed.

In an example embodiment, a repeatable workflow that includes the function can be generated. The repeatable workflow may be selectable for execution on one or more additional seed entities. In an example embodiment, the function includes a built-in function that is available for use as part of multiple different repeatable workflows.

In an example embodiment, an alert is generated and presented to an end user. The alert may include metadata indicative of the traversal path between the seed entity and the matching entity that includes the one or more intermediary links that connect the seed entity to the matching entity via the one or more intermediary entities. In an example embodiment, the metadata includes a visual depiction of the traversal path.

In an example embodiment, the function comprises at least one of a filtering operation or a query operation. In an example embodiment, the one or more intermediary entities are determined to satisfy the one or more criteria associated with the function by executing the at least one of the filtering operation or the query operation on the seed entity or an intermediary entity to obtain a set of results that includes the one or more intermediary entities. In an example embodiment, the traversal path is determined by determining a correspondence between the set of results and the at least one of the filtering operation or the query operation.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
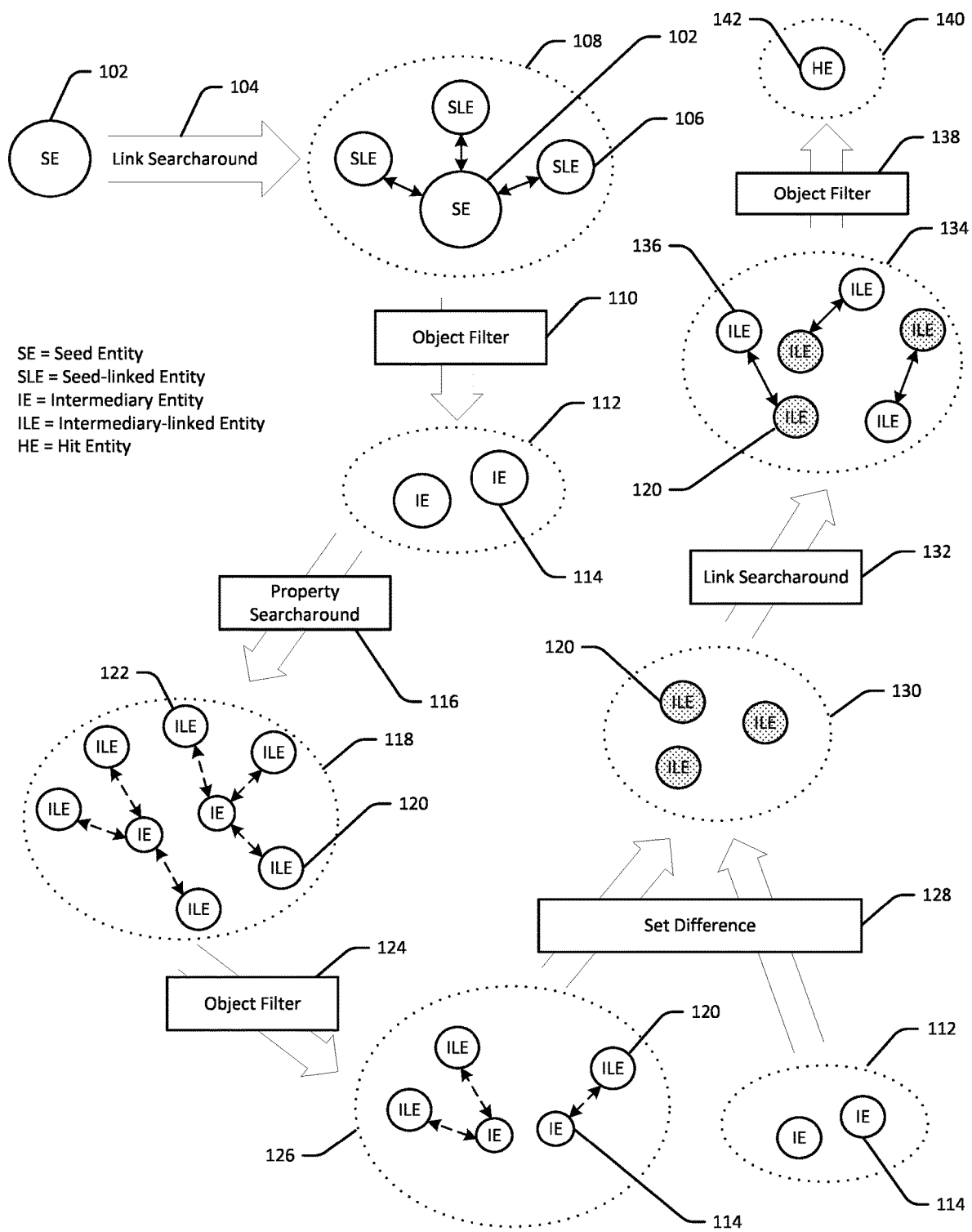
FIG. 1 is a schematic diagram illustrating a path traversal from a seed entity to a hit entity through one or more intermediate entities based on a function executed on the seed entity in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Example embodiments relate to, among other things, systems, methods, and non-transitory computer readable media for defining and executing functions for determining a matching entity that is relevant to an entity of interest when, for example, there is a significant number of intermediary links and/or entities between the matching entity and the entity of interest, and for illustrating or otherwise conveying a path traversal from a seed input entity to an output matched entity to an end user in a manner that allows the end user to ascertain the sequence of intermediary links and entities that connect the matched entity to the seed entity.

In example embodiments, a user interface such as a graphical user interface (GUI)-based functions editor may be provided via which an end user may create a function definition. In a general sense, a function defined in accordance with example embodiments is a chained rule that receives an input or a collection of multiple inputs, evaluates a set of criteria against the input(s) and/or one or more intermediary inputs, and produces an output that satisfies the criteria established by the function. More specifically, a defined function may receive an initial input (e.g., a seed entity) or a collection of initial inputs and may execute a sequence of operations, with each operation receiving, as input, an output of a previous operation, and producing an output that serves as input for a next operation in the sequence, until an output of a final operation in the sequence is obtained. The output of the final operation may represent a hit entity linked to the seed entity via the sequence of intermediary outputs obtained as a result of execution of the sequence of operations. Each such operation of the function may evaluate an input (e.g., the initial seed entity input or an intermediary input that was the output of a prior operation) against one or more criteria to obtain an output.

In example embodiments, the user may construct the function using one or more built-in functions. Each built-in function may be a predefined function that includes one or more query operations and/or one or more filtering operations. In example embodiments, a built-in function may also perform a set-based operation such as a set difference, a set union, or a set intersection. Each built-in function may be represented by a selectable button, icon, or the like in the GUI-based functions editor. Once selected, various parameters for the built-in function may be selected. For instance, if a built-in function that performs a filtering operation is selected, the nature of the filtering to be done may be selected such as filtering a set of inputs by type (e.g., person, phone, financial account, etc.) or filtering a set of inputs by property (e.g., name, age, geographical area, etc.). As another non-limiting example, a built-in function that performs a query operation based on a property value may be selected, in which case, a user may specify the property value (e.g., name, DOB, address, phone number, etc.) of the input entity that is to be searched (e.g., matched against) with respect to properties of other entities. As yet another non-limiting example, a built-in function that performs a query operation based on a type of link specified by an end user may be selected (e.g., entities that are owners of cell phones associated with particular numbers). The various types of links that may exist between entities will be described in more detail later in this disclosure. It should be appreciated that the above examples of the types of built-in functions that may be provided and the various parameters that may be specified with respect to such functions is merely illustrative and not exhaustive.

In example embodiments, a function definition may include one or more previously defined custom functions in addition to one or more built-in functions. More specifically, after a custom function has been defined, it can be stored as a repeatable workflow, and may be selectable for use as part of another potentially more complex function definition. In this manner, in example embodiments, additional custom functions can be constructed using any combination of built-in functions and/or previously defined custom functions.

A function constructed in accordance with example embodiments can be executed on any of a variety of initial seed entities. For instance, an end user can designate a collection of one or more seed entities on which to execute a function on a periodic or ad hoc basis. If a matching hit entity results from execution of a function on a seed entity, an alert may be generated. The alert may provide the end user with an indication of the hit entity. The alert may further include metadata that is indicative of the series of intermediate hops (e.g., intermediary entities and links there between) that connect the seed entity to the hit entity. In example embodiments, the metadata may take the form of a visual or graphical depiction of the traversal path from the seed entity to the hit entity. The traversal path may include a path traversed from the seed entity to the hit entity via one or more intermediary entities and links there between as the function is executed on the seed entity.

Some searching approaches suffer from a number of technical drawbacks including, for example, the inability to determine a matching entity that is relevant to an entity of interest when there is a significant number of intermediary links an entities between the entity of interest and the matching entity. In addition, some searching approaches suffer from the technical drawback of lacking the capability to illustrate or otherwise convey a path traversal from an initial entity of interest to an output matching entity in a manner that allows an end user to ascertain the series of intermediary entities and links that connect the matching entity to the initial entity of interest. Still further, some searching approaches lack the capability to define repeatable workflows that can be applied to a broad range of seed entities.

Example embodiments of the invention provide technical solutions that address at least the aforementioned technical drawbacks. More specifically, example embodiments of the invention provide a capability to generate a function that can be stored as a repeatable workflow and executed on different seed entities on a periodic or ad hoc basis. In accordance with example embodiments of the invention, a function can be constructed using any suitable combination of built-in functions and/or previously defined custom functions, thereby allowing for a matching entity to be determined for a seed entity regardless of the number of intermediary links and entities that may connect the matching entity to the seed entity. As a result, example embodiments of the invention provide a technical solution, and thus a technological improvement, to the technical problem that some searching techniques suffer from in not being able to ascertain connections between entities when such connections include a large number and complex sequence of intermediary links and entities.

In addition, example embodiments of the invention provide an alert capability, whereby a hit entity produced as an output from execution of a function on a seed entity can be indicated to an end user along with metadata that indicates a traversal path that connects the seed entity to the hit entity via one or more intermediary entities and links. In example embodiments, the metadata may take the form of a visual or graphical depiction of the traversal path. This constitutes a technical solution, and thus a technological improvement, to the technical problem that some searching techniques face in not being able to convey in an easily digestible manner the series of intermediary entities and links there between that connect a seed entity to a hit entity.

Moreover, example embodiments of the invention provide the capability to define a function and then store the function as a repeatable workflow that allows the function to be re-used in connection with different seed entities and/or as part of other custom function definitions. Still further, example embodiments of the invention provide a user-friendly functions editor (e.g., a GUI-based user interface) that allows an end user to build a function by selecting pre-defined built-in functions and/or previously defined custom functions and specifying associated parameters without needing any programming knowledge or capability. Each of the aforementioned technical aspects of example embodiments of the invention constitutes a technical solution to some searching techniques' failure to provide an easy-to-use interface for generating repeatable workflows for determining connections between entities regardless of the number and/or complexity of the intermediary links and entities that connect the entities.

Referring now to FIG. 1, a schematic diagram illustrating a path traversal from a seed entity to a hit entity through one or more intermediate entities based on a function executed on the seed entity is shown in accordance with an example embodiment of the invention. A seed entity 102 is depicted. The seed entity 102 may be an entity of interest to an end user. More specifically, the seed entity 102 may be any entity for which it is desirable to ascertain other entities that are connected/linked to the seed entity 102 in some fashion. An "entity" may refer to any real world tangible or intangible thing that has corresponding attributes that may be useful in identifying the entity and distinguishing the entity from other entities. For instance, an entity may be a person, an organization, a physical item (e.g., a cell phone), an event, a geographic location, a financial account, a document, or the like. An attribute associated with an entity may be referred herein to as an "entity property" or simply "property." Example entity properties may include, for example, names, identification numbers, demographic characteristics, dates, addresses, or the like.

In example embodiments, prior to defining a function to be executed on the seed entity 102, a seed object representative of the seed entity 102 may first be generated. A set of properties may be associated with the seed object. The set of properties associated with the seed object may be identified based on pre-existing knowledge of the seed entity. Alternatively, the set of properties may be identified as part of a preliminary search conducted to identify useful information related to the seed entity in order to construct more effective functions and underlying filtering and/or query operations. For instance, a preliminary search can be conducted with limited information, such as a name and a date of birth of a person. Such an example simple search may reveal additional properties of the entity, such as a social security number, a city of birth, an address, images of the person, social networking accounts associated with the person, a phone number, and email addresses.

Based on prior knowledge and/or during the optional preliminary search, entities related with the seed entity may be discovered. Such related entities may be referred to herein as "related entities" or "seed-linked entities." The relationship between any two entities may be referred to herein as a "link." Relationships between the seed entity 102 and a seed-linked entity 106 may be "hard links" that are stored in a database along with a corresponding type (e.g., "sibling of" type). Any links between entities that are discovered through property matches may be referred to herein as "soft links." Hard links are depicted in FIG. 1 using solid double-arrow lines while soft links are depicted using dashed lines.

In example embodiments, the seed entity 102 may be linked to one or more seed-linked entities (e.g., seed-linked entity 106). The seed entity 102 and the one or more seed-linked entities to which the seed entity 102 are linked forms a seed cluster 108. As a non-limiting example, if the seed entity 102 is a person, the seed-linked entity 106 may be a financial institution where the person holds an account or has conducted financial transactions. As another non-limiting example, another seed-linked entity linked to the seed entity 102 may be a second person who co-owns a business with the seed entity 102, is a co-debtor on a home or car loan, or the like.

Figure 2:
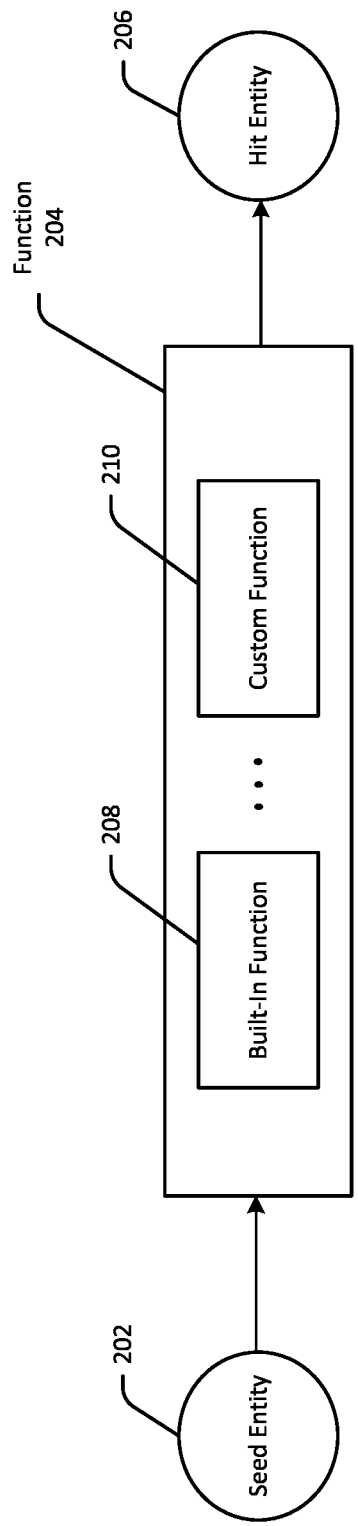
FIG. 2 is a schematic representation of the execution of a function on a seed entity to determine a hit entity linked to the seed entity in accordance with an example embodiment of the invention.

In example embodiments, an end user may select, via a functions editor that includes, for example, a GUI-based user interface, a pre-existing custom and/or built-in function for execution on the seed entity 102. Alternatively, the end user may construct a new custom function using any combination of built-in function(s) and/or previously defined custom functions. A schematic representation of a function 204 that may be constructed and executed on a seed entity 202 is shown in FIG. 2. The seed entity 202 may be any entity type such as a person, an organization, a physical item, an event, a geographic location, a financial account, a document, or the like. The function 204 may be constructed from one or more built-in functions 208 and/or one or more custom functions 210. It should be appreciated that an end user has flexibility in constructing the function 204. For instance, the function 204 may contain only built-in function(s) 208, only custom function(s) 210, or some combination of built-in function(s) 208 and custom function(s) 210. Once constructed, the function 204 can be executed on the seed entity 202 to determine a hit entity 206 that satisfies a series of conditions established by the sub-functions that make up the function 204. Examples types of built-in functions 208 that may be used to construct the function 204 and the manner in which the function 204 may be executed on the seed entity 204 to identify intermediary links and entities that connect the seed entity 202 to the hit entity 206 will be described in more detail hereinafter.

In example embodiments, a built-in function 208 may be a filtering operation. The filtering operation may, for example, filter an input set of objects down to objects that are of a specific type (e.g., persons). In example embodiments, after an end user selects a built-in filtering function 208, the end user may select, as parameters, one or more object types based on which the filtering is to be performed. For instance, the end user may select the object type(s) from a drop-down menu or the like of predefined object types. In some example embodiments, multiple object types may be specified, in which case, the object type filter may return objects that correspond to any of the object types specified (e.g., the results may be OR'ed together). Alternatively, an object-type filter may filter an input set of objects based on one or more object types that an end user specifies should be excluded. For instance, an object type filter may filter an input set of objects down to those objects that are not persons.

In example embodiments, a built-in function 208 may be a property type filter that performs a filtering operation based on one or more property values. In example embodiments, a property type filter may filter an input set of objects down to objects having specific property values specified by an end user. The filtered set of objects may be the intersection or the union of multiple specified property values. For instance, an intersection-based property type filter may filter an input set of person objects down to those that are not male and over the age of 60, in which case, only those persons who are both not male and over 60 would be included in the filtered output. As another non-limiting example, a union-based property type filter may filter an input set of person objects down to those that are female or below the age of 40, in which case, all persons who are female or below the age of 40 (male or female) would be included in the filtered output set of results. In example embodiments, if both object type and property type filters are specified as part of the same built-in function 208, then the function would return the intersection of the results.

In example embodiments, a built-in function 208 may also perform a query operation. As a non-limiting example, the query operation performed by a built-in function 208 may be a link searcharound type of query operation according to which a hard-link searcharound may be performed on a given input to return results that are linked to the input based on one or more link types that are specified. In example embodiments, a link searcharound query operation may default to any link types. In other example embodiments, an end user who seeks to utilize a link searcharound built-in function may specify one or more link types to which the searcharound is to be restricted. As a non-limiting example, the link type "ownerof" may be specified, in which case, the link searcharound would be restricted to those entities that are related to the input entity by the "ownerof" link. For instance, if the input is a particular person, a link searcharound performed based on the "ownerof" link type may return a mortgage application submitted by the person, a cell phone registered to the person, or the like, but may exclude entities that are linked to the input person but that do not satisfy the "ownerof" link relationship (e.g., a friend or relative of the input person).

In example embodiments, another type of query operation that may be performed by a built-in function 208 is a property searcharound type of query operation. A property searcharound query operation may receive an object as input and perform any type of search on a property value including, without limitation, exact match keyword searches on specific property values, or property match searcharounds. In example embodiments, an end user may be able to specify multiple property values based on which a property searcharound query operation is to be performed for a given built-in function 208. That is, any particular built-in function 208 may perform a property searcharound query with respect to one or more property values. In example embodiments, if multiple property values are specified for a property searcharound query, then the results may include only those entities associated with all of the specified property values (e.g., an AND of all the property values rather than an OR). As a non-limiting example, if a first name, last name, and social security number are specified as property values, then the set of results would only include those entities that matched on all three of these property values.

As previously noted, property searcharound queries may perform a search for an exact keyword match of a property value. For instance, an input person object's first and last name may be searched against corresponding name property values of other entities to identify those entities having first and last name property values that exactly match those of the input person object. In other example embodiments, a property searcharound query may perform a fuzzy search on one or more property values. For instance, an example property searcharound query may perform a fuzzy search on a name property and/or a date of birth property. A fuzzy search may detect matches in situations where there is no exact keyword match, but a link may nonetheless exist. For instance, a fuzzy name search may match against variations of a name such as a name's initial letter, some portion of a first name and/or some portion of a last name, a nickname, or a different spelling (or misspelling) of a name. In this manner, a link between a person and potential aliases or alternative names or spellings used by that person may be uncovered, for example.

In certain example embodiments, when an end user selects a built-in function 208 that performs a property searcharound query operation, for example, in addition to selecting the types of properties to search on the input and match against the output, the end user may also be provided with the capability to select one or more templates for matching against input property values. In other example embodiments, the end user may be provided with the capability to define custom templates.

Each such template may define the types of fuzzy searches that may be performed with respect to a property to be searched and the types of variants of values of that property that would be considered a match. For instance, a template for a physical address property searcharound may match on an address with or without a zip code; on variants of the zip code (5 digits or 9 digits); on variants of road designations (e.g., Street vs. St, NE vs. Northeast, etc.); and so forth. As another non-limiting example, a date template for a property searcharound query may match on variations of a date format (e.g., MM/DD/YYYY, MM/DD/YY, etc.); a date with or without slashes; dates with alternative symbols (e.g., dashes instead of slashes); and so forth. As yet another non-limiting example, a phone number template for a property searcharound query may match on variants of a phone number that utilize different symbols to demarcate portions of the phone number (e.g., XXX-XXX-XXXX, XXX.XXX.XXXX, (XXX) XXX-XXXX, etc.); phones numbers with or without demarcation symbols; and so forth. As still another non-limiting example, an email address template for a property searcharound query may match on variants of an email address (e.g., with or without the @ . . . com). It should be appreciated that the above examples of templates for matching against variants of a property value are merely illustrative and not exhaustive.

It should be appreciated that the above examples of the types of link and/or property searcharound queries that may be performed are merely illustrative and not exhaustive. A variety of different types of searcharound queries can be specified with different parameters and criteria. For instance, another example link searcharound query may be one designed to locate common contacts. Such a query may, given a set of input entities, return entities that are directly linked to at least two entities in the input set. As another non-limiting example, another example property searcharound query may evaluate combination criteria and may, for instance, returns entities that match on both the name and date of birth properties for a given set of input entities. As yet another non-limiting example, a property searcharound query may perform a "mix and match" evaluation where, given an input set of entities, the query would return results that match on at least 2 defined property values (e.g., match on at least two of: name, date of birth, address, license #, etc.). As still another non-limiting example, a query may perform a sliding time range operation such that when given an input set of events, the query would return results that occurred within a selected amount of time (e.g., one day) from each input event.

In example embodiments, some results returned as a result of a query operation may be well-defined entries in a database, such as a record of a financial transaction. The record may include an entry for each party to the transaction, the bank, the account numbers, and the amount of the transaction. When a query is carried out against an unstructured data source, however, such as a collection of documents, the search results may be less structured. For example, a search result (or "hit") may be a report that includes the names of entities and a bank account number in plain text with no marking or identification. For an unstructured search result, potentially relevant words, phrases, or other strings can be tagged or marked to facilitate further analysis. Automated tagging can also be facilitated using natural language processing analysis and predefined regular expressions.

In addition, it is also possible that some of the information in a document is not formatted optimally for processing. For instance, phone numbers may include various hyphens and brackets, first and last names may be arranged differently, and addresses can come in different formats. Accordingly, an optional cleanup step can be carried out, such as by adopting a standardized format for each type of data of interest. For instance, all strings recognized as U.S. phone numbers can be reformatted as (XXX)-XXX-XXXX if not already in this format. Such cleanup and tagging can facilitate matching against property value variants.

As previously noted, a built-in function 208 may also perform a set-based operation such as a set difference, a set union, or a set intersection. In some example embodiments, a set-based operation performed by a built-in function 208 may be inherent to a filtering or query operation performed by the function. For instance, a property searcharound that searches on multiple property values may perform a set union or a set intersection of the matched property values when returning results. In other example embodiments, a built-in function 208 may exclusively perform a set-based operation such as a set difference. A set difference operation may take two sets of objects as input and output all objects present in one set but not present in the other set. It should be appreciated that the above-described types of set-based operations are merely illustrative and not exhaustive.

In example embodiments, an end user may select one or more built-in functions 208 to construct the function 204. The end user may specify one or more parameters for each such built-in function 208 (e.g., one or more object/property types to filter based on; one or more link types based on which to perform a link searcharound; one or more property types based on which to perform a property searcharound; etc.). In certain example embodiments, an end user may also select and/or define one or more templates for searching on variants of a property value, for example. Further, in example embodiments, and in addition to, or as an alternative to, the one or more built-in functions 208, an end user may also utilize one or more previously defined custom functions 210 to construct the function 204.

Referring again to FIG. 1, an example implementation of the custom function 204 will be described. Specifically, FIG. 1 illustrates the sequence of built-in functions 208 that are executed as part of execution of the example custom function 204 as well as the traversal path that is followed from the seed entity 102 to a hit entity 142 via various intermediary entities and links. In example embodiments, an end user may select the particular types of built-in functions 208 illustratively shown in FIG. 1 while constructing the example custom function 204 and may specify (if necessary) the specific parameters for each such built-in function (e.g., object type/property for a filtering operation; link types for a link searcharound query; property values for a property searcharound; variant property values to be searched for a property searcharound; etc.). In some example embodiments, certain parameters may already be specified in the built-in function 208 such as within a template that specifies which property value variants to match against. In other example embodiments, the end user may specify the parameters (e.g., the property value variants) for a template while constructing the function 204. Once constructed, the function 204 may be stored as a repeatable workflow that can be selected for execution on other seed entities. In addition, it should be appreciated that while the example custom function 204 illustrated in FIG. 1 will be described in connection with various constituent built-in functions 208, a custom function 204 may include any combination of built-in functions 208 and/or previously defined custom functions 210 that are stored and selectable as repeatable workflows within the function 204.

In example embodiments, the seed entity 102 may be a person object and the first operation executed on the input seed entity 102 as part of execution of the example custom function 204 may be a link searcharound query operation 104. In example embodiments, the link searcharound query 104 may perform a hard link searcharound on the seed entity 102 for any other entity linked to the seed entity 102 via one or more link types. In the example implementation depicted in FIG. 1, the link searcharound query 104 may perform a hard link searcharound for entities linked to the seed entity 102 via an "ownerof" link, for example. A hard link searcharound query based on the "ownerof" link may reveal any seed-linked entities 106 linked to the seed entity 102 via such a link such as, for example, financial accounts of the seed entity 102; mortgage accounts associated with the seed entity 102; items owned or leased by the seed entity (e.g., automobiles); items registered to the seed entity 102 (e.g., automobiles, cell phones, etc.); and so forth. The seed entity 102 along with the seed-linked entities 106 linked to the seed entity 102 (via the "ownerof" link in this example but potentially via one or more other link types in other example implementations) may together form a seed cluster 108.

Continuing with the description of the execution of the example custom function 204 depicted in FIG. 1, the next operation executed as part of the example workflow may be a filtering operation based on an object type. The object type filter 110 may receive, as input, each seed-linked entity 106 identified as a result of the link searcharound query 104 and may filter the input set down based on object type to only those seed-linked entities 106 that are a particular object type (e.g., phones). For instance, each seed-linked entity 106 included in the filtered output 112 may be a phone object that is linked to the seed entity 102 via the "ownerof" link, and each such phone object may be referred to hereinafter as an intermediary entity 114.

Continuing with the example function workflow, the filtered output 112 of the object type filter 110 may be received as input by a next operation of the example custom function 204 workflow—a property searcharound query operation 116. As previously noted, a property searcharound query operation 116 may perform various soft-link searches for entities associated with one or more property values that match against one or more property values of the input set. In the example implementation of FIG. 1, the property searcharound query operation 116 may perform a searcharound based on the phone number property, in which case, the query operation 116 would search for matches of the phone number property value of each intermediary entity 114 of the input set against phone number property values (including potential variants) associated with other entities. In example embodiments, the property searcharound query operation 116 may reveal that one or more of the intermediary entities 114 in the input set (which in this example are phones linked to the seed entity 102 via the "ownerof" link) are each linked to one or more intermediary-linked entities based on a match on the phone number property.

It should be appreciated that the output 118 of the property searcharound query operation 116 may include intermediary-linked entities of any of a variety of different object types. For instance, an intermediary-linked entity 120 may be another phone that received a call from or placed a call to an intermediary entity 114, and thus, matched on the phone number property because the phone number of the intermediary-linked entity 120 appears in phone records of the intermediary entity 114 and vice versa, for example. As another non-limiting example, an intermediary-linked entity 122 may be another type of object (e.g., a document such as a credit card application) that includes text that matches the phone number property value of an intermediary entity 114.

Continuing with execution of the example custom function 204 depicted in FIG. 1, the output 118 of the property searcharound query operation 116 may be received as input by a next built-in function 208 in the execution sequence of the custom function 204—a filtering operation 124 based on an object type. In particular, in example embodiments, the object type filter 124 may receive the output 118 as input and filter the input based on object type. In the example being described, the object type filter 124 may filter the input 118 to produce a filtered output 126 containing only phones, for example. The filtered output 126 of the object type filter 124 may include 1) all phones, for example, that matched on the phone number property, and thus, may include intermediary-linked entities 120, which are phones linked via call records to the intermediary entities 114, which in turn, are phones "owned" by the seed entity 102 as well as 2) the intermediary entities 114 themselves.

Because the filtered output 126 of the object type filter 124 includes both phones "owned" by the seed entity 102 (intermediary entities 114) as well as phones (intermediary-linked entities 120) linked to the seed entity's phones via the property searcharound 116 executed based on the phone number property, the next operation executed as part of the custom function 204 workflow may be a set difference operation 128. The set difference 128 may take the difference between two input sets—specifically, the set 126 containing both the intermediary entities 114 (e.g., phones "owned" by the seed entity 102) and the intermediary-linked entities 120 (e.g., other phones linked to the intermediary entities 114 via call records) and the set 112 containing only the intermediary entities 114. The resulting output 130 may thus contain only the intermediary-linked entities 120 and may exclude the intermediary entities 114. Thus, in the example custom function 204 of FIG. 1, the output 130 may contain only phones of entities other than the seed entity 102, but which are linked to the seed entity's 102 phones via call records, for example. Generally speaking, the set difference operation may be useful in those example scenarios in which it is desirable to remove any self-references to objects previously found in a function along the traversal path of the function.

As previously noted, the output 126 contains phones that match the seed entity's 102 phones on the phone number property, which necessarily includes the seed entity's 102 phones. The example custom function 204 implementation of FIG. 1 arrives at the output 126 by performing the property searcharound query 116 on the input set 112 containing phones associated with the seed person 102 to find all entities that match on the phone number property and filtering this result down to just phones. In some example embodiments, the output 126 may be arrived at using a different sequence of sub-functions in the execution workflow of the custom function 204. For instance, in other example embodiments, a link searcharound query may instead be performed on the input set 112 containing the seed entity's phones to identify linked phone calls. Another link searcharound query operation can then be performed on the linked phone calls to identify the output set 126 containing all linked phones including the seed entity's phones in set 112. Despite this being an alternative workflow sequence for arriving at set 126, the set difference operation 128 can nonetheless similarly be performed to restrict the set 126 down to just phones that were called by or placed a call to the seed entity's 102 phones.

Continuing with execution of the example custom function 204 of FIG. 1, a link searcharound query operation 132 may then be executed on the set 130 containing only the intermediary-linked entities 120 (e.g., phones associated with entities other than the seed entity 102 but which are linked to phones of the seed entity 102 via a match on the phone number property). The link searcharound query operation 132 may perform a hard-link searcharound on the input set 130. The hard-link searcharound may perform a search for entities 136 linked to the intermediary-linked entities 120 via one or more link types. For instance, according to the example custom function 204 implementation of FIG. 1, the link searcharound query operation 132 may search for entities linked to the intermediary-linked entities 120 via the "ownerof" link type. It should be appreciated that the intermediary-linked entities 120 may not be part of the output set 134, but are being shown merely to detail the hard links between the intermediary-linked entities 120 and the intermediary-linked entities 136.

As previously noted, the input set 130 contains, for example, phones that matched on the phone number property against phones associated with the seed entity 102, but which are associated with entities other than the seed entity 102. As such, the link searcharound query operation 132 may generate an output set 134 containing intermediary-linked entities 136 (e.g., person objects) that are linked to the intermediary-linked entities 120 (e.g., phones associated with entities other than the seed entity 102) via the "ownerof" link type. For instance, the intermediary-linked entities 136 may be the persons to whom the intermediary-linked entities 120 (e.g., phones) are registered.

An object type filter 138 may be a final built-in function 208 executed as part of the execution workflow for the example custom function 204 implementation of FIG. 1. The object type filter 138 may receive the set 134 as input. As previously noted, the set 134 contains, in example embodiments, person objects that are linked to phones that made or received calls with phones linked to the seed entity 102. The object type filter 138 may filter this input set 134 down to a set 140 containing person objects corresponding to those persons previously labeled or categorized as persons of interest. In particular, the final output set 140 may contain one or more hit entities 142 representative of persons of interest who are linked to phones (via the "ownerof" link) that made or received calls with a phone linked to a seed person.

In some example embodiments, two or more search results are likely related as determined by, for instance, their source or common use of identifying information or properties of certain entities. In such an example scenario, these search results can be aggregated to represent a single hit entity 142. With or without aggregation, a search result can be represented as a "hit cluster" 140, which may include properties of a hit entity as well as properties of one or more entities believed to be linked to the hit entity (and thus referred to as "hit-linked entities").

In example embodiments, hit clusters can be scored to indicate the usefulness or relevance of the hit entities contained therein to the seed entity 102. Scoring a hit cluster can be done by taking into consideration one or more of the following factors: (a) likelihood of a match between the seed entity 102 and the hit entity 142 or between a seed-linked entity 106 and a hit-linked entity (b) presence of a new entity in the search result not present in prior search queries or a difference between the new entity and an entity present in prior search queries, and (c) characteristics of the new entity in the search result, e.g., type and time since creation. In other words, factor (a) concerns the "validity" of the hit cluster; factor (b) concerns the "novelty" of the hit cluster, i.e., whether an end user is already aware of the information included in the hit cluster, and factor (c) concerns the value of the hit cluster.

In example embodiments, when a hit entity 142 is discovered as a result of executing a custom function 204 on a seed entity 102, an alert may be generated and sent to an end user to inform the user of the detection of the hit entity 142. The end user may have previously indicated a desire to receive such alerts generally and/or with respect to certain entities including the seed entity 102. In example embodiments, the alert may include metadata that is indicative of the traversal path that was taken during execution of the function on the seed entity 102. The traversal path may reveal the specific intermediary entities and links there between that connect the hit entity 142 to the seed entity 102. For instance, the traversal path for the example custom function 204 of FIG. 1 may reveal the connection of the person represented by the seed entity 102 to her phones, the connection of her phones to phones she called or received a call from, the connection of those phones to their owners, and the presence of any persons of interest among those owners.

In example embodiments, various graphics, symbols, text, or the like may be used to represent the seed entity 102, various intermediary entities, various links between entities, and/or the hit entity 142 as part of a visual depiction of the traversal path. In some example embodiments, the visual representation of the traversal path may depict each intermediary output of execution of a corresponding sub-function in the series of sub-functions that constitute the custom function 204. For example, all entities linked to the seed entity 102 via the "ownerof" link may be shown (e.g., documents, homes, automobiles, etc.), followed by the filtering of that set down to only phone object types. In other example embodiments, certain intermediary outputs may not be shown to enhance clarity of the traversal path depiction that is provided. For instance, the link between the seed entity 102 and her phones may be shown without showing the intermediary output of all types of entities connected to the seed entity 102 via the "ownerof" link type.

In example embodiments, a toggle may be provided for garbage collecting metadata that may be irrelevant to the hit entity 142. For instance, if one or more searcharounds are performed around A to discover B and C, but B is later filtered out from a set of results, the metadata returned may only show the connection between A and C and may exclude the connection between B and A. In example embodiments, this may be a default setting or may be selectable via the toggle. In example embodiments, if the garbage collecting feature is not enabled, the metadata showing the connection between A and B may be presented to the end user, but C may only be returned as a result.

It should be appreciated that the custom function implementation described in reference to FIG. 1 is merely illustrative. Any number of custom functions having any degree of complexity can be defined according to example embodiments of the invention. In particular, an end user may define or select a previously defined custom function designed to trigger an alert based on any combination of criteria that the end user desires to evaluate. For instance, an end user may define or utilize a previously defined function to trigger an alert when a person of interest has additional social media accounts that have not yet been linked to him using Internet Protocol (IP) log events and/or known identifiers. As another non-limiting example, an end user may define or utilize a previously defined function to trigger an alert when a person of interest makes an overseas financial transaction.

Figure 4:
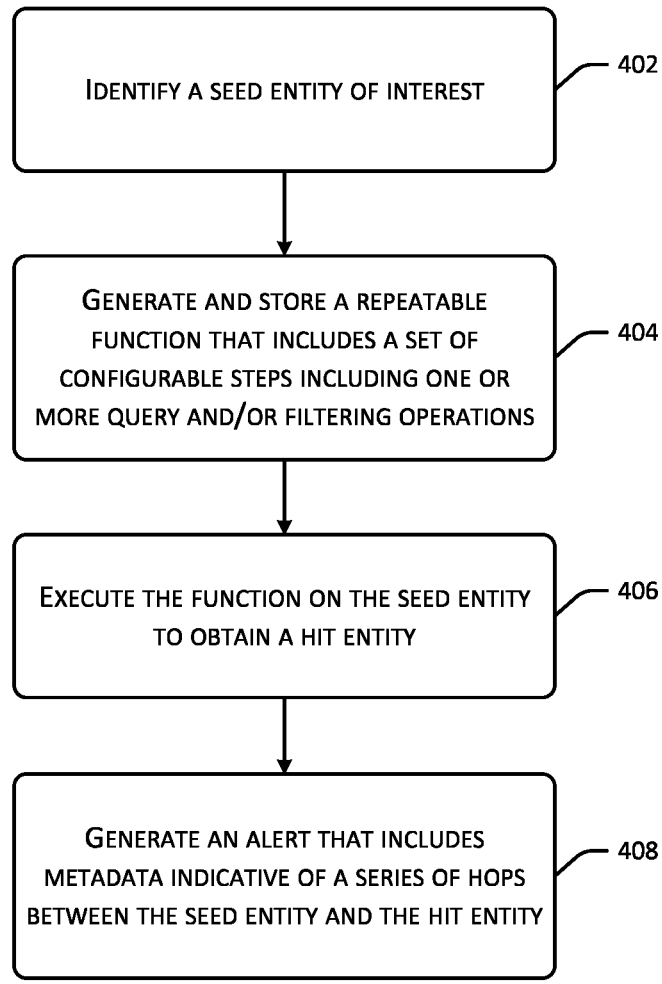
FIG. 4 is a process flow diagram of an illustrative method for executing a function on a seed entity to determine a hit entity linked to the seed entity and one or more intermediary entities via which the hit entity is linked to the seed entity in accordance with an example embodiment of the invention.

FIG. 4 is a process flow diagram of an illustrative method 400 for executing a function on a seed entity to determine a hit entity linked to the seed entity and one or more intermediary entities via which the hit entity is linked to the seed entity in accordance with an example embodiment of the invention. Each operation of the method 400 can be performed by one or more of the program modules depicted in FIG. 5, for example, whose operation will be described in more detail hereinafter. These program modules can be implemented in any combination of hardware, software, and/or firmware. In certain example embodiments, one or more of these program modules can be implemented, at least in part, as software and/or firmware modules that include computer-executable instructions that when executed by a processing circuit cause one or more operations to be performed. In other example embodiments, these program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring now to FIG. 4, at block 402 of the method 400, a function generation module (FIG. 5) may identify a seed entity of interest. In example embodiments, the function generation module may identify the seed entity of interest based on input received from an end user. For instance, an end user may select (e.g., subscribe to) one or more seed entities for which to receive alerts when hit entities are identified based on execution of functions on the seed entities. The seed entities may be persons; tangible items (e.g., automobiles, homes, cell phones, etc.); intangible items (e.g., financial accounts); events; or any other thing capable of being modeled as an entity having one or more properties associated therewith. A function executed on a seed entity of interest may be a previously defined custom function, a built-in function, or a custom function that includes one or more built-in functions and/or one or more previously defined custom functions, where such a custom function is defined as part of the example method 400 (described in more detail hereinafter). In example embodiments, an end user may also designate which function(s) (stored as repeatable workflows) are to be executed on which seed entities of interest as well as the schedule according to which such function(s) are to be executed.

At block 404 of the method 400, the function generation module may generate and store a repeatable function that includes a set of configurable steps, where the set of configurable steps includes one or more filtering operations and/or one or more query operations. More specifically, in example embodiments, an end user may create a custom function definition at block 404 that includes, for example, selecting one or more built-in functions to form at least part of the sequence of operations performed by the custom function. The built-in functions selected may include any of the types of functions previously described including, without limitation, a filter by object type operation; a filter by property value operation; a property searcharound query operation; a link searcharound query operation; a set-based operation; or the like. In example embodiments, the end user may specify various parameters for a selected built-in function such as, for example, a type of object to filter based on; a property value to filter based on; a type of link to perform a searcharound query based on; a property and corresponding property value to search and match against as part of a property searcharound query operation; property value variants to search and match against; or the like. In other example embodiments, certain parameters of a built-in function may be specified in the function definition of the built-in function itself such as, for example, within templates that specify which variants of a property value to match against. It should be appreciated that, in example embodiments, an end user may select one or more previously defined custom functions in addition to, or as an alternative, to selecting built-in functions to form the function at block 404.

Figure 3:
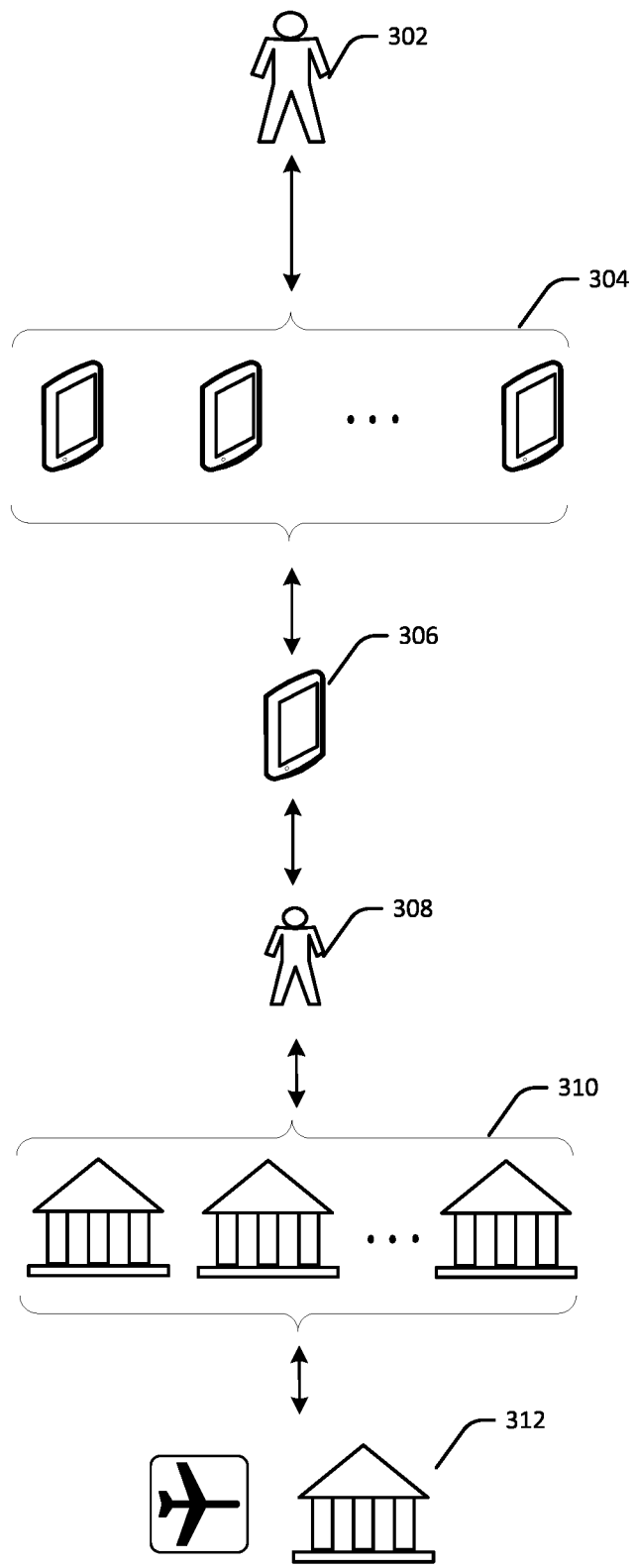
FIG. 3 depicts a schematic representation of metadata associated with a function executed on a seed entity that illustrates a series of intermediate hops between the seed entity and a hit entity in accordance with an embodiment of the invention.

At block 406 of the method 400, a function execution module (FIG. 5) may execute the function defined at block 404 to identify one or more hit entities. An example execution workflow for an example implementation of a custom function has already been described with respect to FIG. 1. FIG. 3 depicts a schematic representation of metadata associated with another example function that may be executed on a seed entity. The schematic representation of the metadata illustrates a series of intermediate hops between the seed entity and a hit entity in accordance with an embodiment of the invention.

Referring now to FIG. 3, a custom function (e.g., the function executed at block 406) may be executed on a seed entity 302 that is a person. The custom function may include any combination of built-in functions and/or previously defined custom functions. In the example custom function implementation of FIG. 3, the first sub-function of the custom function that is executed on the seed entity 302 may be a link searcharound query to identify all entities linked to the seed entity 302 via the "ownerof" link, for example. An object type filter may then be applied to the result of the link searcharound query to filter down to a set of cell phones registered to the seed person 302. In example embodiments, a property searcharound query may then be performed to identify all entities that match on the phone number property with the set of cell phones registered to the seed person 302. This result may be filtered down to just cell phones and a set difference operation may then be performed between the filtered set containing all cell phones that matched on the phone number property and the set containing only cell phones registered to the seed person 302 to leave a set 304 containing only unique cell phones that were called by or placed a call to at least one of the seed person's 302 cell phones.

In example embodiments, despite multiple built-in functions being executed to establish the series of intermediary links between the seed person 302 and the set 304 of cell phones, the schematic metadata representation of this traversal path may be a condensed representation that simply depicts a link between the seed person 302 and the set 304 of cell phones that were in communication with the seed person's 302 phones. This may aid in the comprehension of the traversal path by an end user. However, in other example embodiments, the traversal path depicted may show every intermediary entity and every intermediary link that connects the seed entity 302 to a hit entity.

One or more operations may then be performed to establish a traversal path from the set 304 of cell phones to the cell phone 306. As a non-limiting example, in some embodiments, a property type filter may be applied to the set 304 to obtain any cell phones registered to persons other than the seed person 302 (e.g., the cell phone 306) that were involved in more than a threshold number of calls with one or more cell phones associated with the seed person 302. As another non-limiting example, a property searcharound query operation may be executed on the set 304 to identify any cell phones in the set 304 that were involved in calls with at least a threshold number of other cell phones in the set 304. In this non-limiting example, the cell phone 306 may be such a cell phone. It should be appreciated that the above examples are merely illustrative and not exhaustive.

In example embodiments, execution of the custom function implementation of FIG. 3 may then involve executing a link searcharound query on the cell phone 306 to identify a person 308 to whom the cell phone 306 is linked via the "ownerof" link, for example. A property searcharound query may then be executed on the person 308 to identify entities that match the person 308 on properties such as name, address, telephone number, social security number, and/or email address as well as potential variants thereof. An object type filter may then be executed to narrow the results of the prior property searcharound query to a set of financial accounts 310 soft-linked to the person 308. A property type filter may then be applied to the set of financial accounts 310 to identify any overseas financial accounts 312. In example embodiments, the complete execution workflow of the example custom function described above may be schematically represented as shown in FIG. 3 to provide a streamlined visual depiction of the traversal path from the seed person 302 to the hit entity (an overseas financial account 312 linked to a person in communication with the seed person 302).

Referring again to the example method 400 of FIG. 4, assuming that at least one hit entity is detected based on execution of the custom function on the seed entity, an alert generation module may generate an alert at block 408 of the method 400. The alert may be sent to an end user who was expressed an interest in receiving such alerts with respect to particular functions executed on particular seed entities. The alert may include metadata indicative of the series of hops (e.g., the intermediary entities, intermediary-linked entities, and the links there between) that connect the seed entity to the hit entity.

As previously noted, the function defined at block 404 may be stored as a repeatable workflow. In this manner, the function may be selectable for execution on other seed entities of interest to an end user and/or for periodic execution on one or more selected seed entities. In certain example embodiments, the stored function may be selected by other end users, and optionally, modified and stored as an updated repeatable workflow. Further, in example embodiments, the stored workflow may be selected for use in constructing other custom functions.

Hardware Implementation

Figure 5:
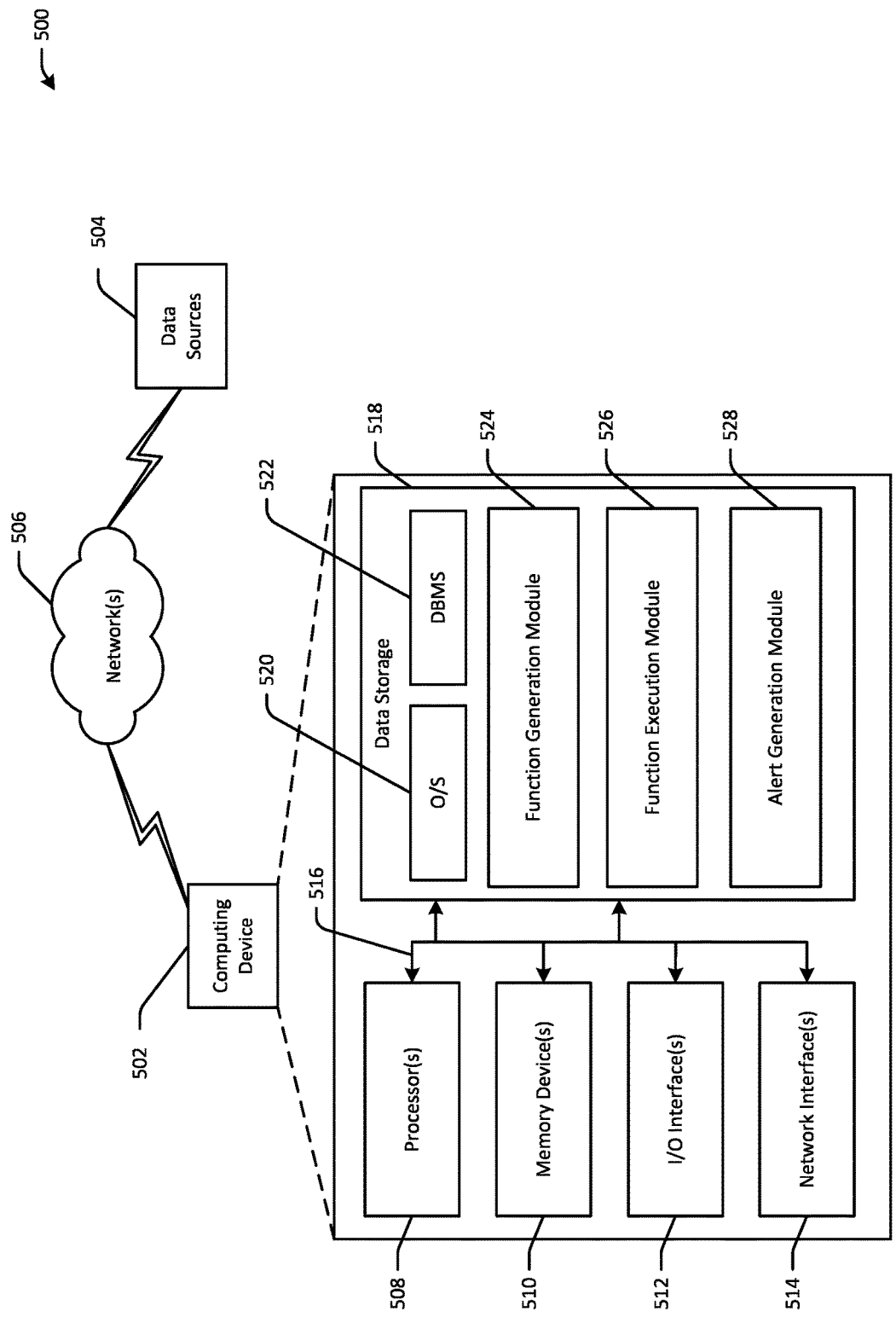
FIG. 5 is a schematic block diagram illustrating an example networked architecture configured to implement example embodiments of the invention.

FIG. 5 is a schematic block diagram illustrating an example networked architecture 500 configured to implement example embodiments of the invention. The networked architecture 500 can include one or more special-purpose computing devices 502 communicatively coupled via one or more networks 506 to one or more data sources 504. The data source(s) 504 may include any suitable data source capable of being accessed and/or searched including proprietary data sources, public data sources, or the like. Data stored in such data source(s) 504 may include structured data, unstructured data, or the like.

The special-purpose computing device(s) 502 may be hard-wired to perform techniques of the invention; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 502 may also combine custom hard-wired logic, ASICs, or FPGAs with custom programming to accomplish the techniques. The special-purpose computing device(s) 502 may be desktop computer systems, server computer systems, portable computer systems, handheld devices, networking devices or any other device or combination of devices that incorporate hard-wired and/or programmed logic to implement the techniques.

The special-purpose computing device(s) 502 may be generally controlled and coordinated by operating system software 520, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other example embodiments, the computing device(s) 502 may be controlled by a proprietary operating system. The operating system software 520 may control and schedule computer processes for execution; perform memory management; provide file system, networking, and I/O services; and provide user interface functionality, such as a GUI.

While any particular component of the architecture 500 (e.g., the computing device(s) 502) may be described herein in the singular, it should be appreciated that multiple instances of any such component can be provided and functionality described in connection any particular component can be distributed across multiple instances of such a component. In certain example embodiments, functionality described herein in connection with any given component of the architecture 500 can be distributed among multiple components of the architecture 500. For example, at least a portion of functionality described as being provided by a computing device 502 may be distributed among multiple computing devices 502.

The network(s) 506 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 506 can have any suitable communication range associated therewith and can include, for example, global networks (e.g., the Internet), metropolitan area networks (MANs), wide area networks (WANs), local area networks (LANs), or personal area networks (PANs). In addition, the network(s) 506 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 502 can include one or more processors (processor(s)) 508, one or more memory devices 510 (generically referred to herein as memory 510), one or more input/output ("I/O")

interface(s) 512, one or more network interfaces 514, and data storage 518. The computing device 502 can further include one or more buses 516 that functionally couple various components of the computing device 502. In example embodiments, the data storage 518 may store various program modules/program modules such as a function generation module 524, a function execution module 526, and an alert generation module 528. Each of these program modules may include logic for performing any of the processes and tasks described earlier in connection with correspondingly referenced program modules. In other example embodiments, each of the aforementioned program modules may include hard-wired circuitry for performing corresponding techniques of the invention and/or circuitry or digital electronic devices such as one or more ASICs or FPGAs that are persistently programmed to perform such techniques.

The bus(es) 516 can include at least one of a system bus, a memory bus, an address bus, or a message bus, and can permit the exchange of information (e.g., data (including computer-executable code), signaling, etc.) between various components of the computing device 502. The bus(es) 516 can include, without limitation, a memory bus or a memory controller, a peripheral bus, an accelerated graphics port, and so forth. The bus(es) 516 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 510 can include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 510 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 518 can include removable storage and/or non-removable storage including, but not limited to, magnetic storage, optical disk storage, and/or tape storage. The data storage 518 can provide non-volatile storage of computer-executable instructions and other data. The memory 510 and the data storage 518, removable and/or non-removable, are examples of computer-readable storage media (CRSM) as that term is used herein. The data storage 518 can store computer-executable code, instructions, or the like that can be loadable into the memory 510 and executable by the processor(s) 508 to cause the processor(s) 508 to perform or initiate various operations. The data storage 518 can additionally store data that can be copied to memory 510 for use by the processor(s) 508 during the execution of the computer-executable instructions. Moreover, output data generated as a result of execution of the computer-executable instructions by the processor(s) 508 can be stored initially in memory 510 and can ultimately be copied to data storage 518 for non-volatile storage.

More specifically, the data storage 518 can store one or more operating systems (O/S) 520 and one or more database management systems (DBMS) 522 configured to access the memory 510 and/or one or more external datastore(s) (not depicted) potentially via one or more of the networks 506. In addition, the data storage 518 may further store one or more program modules, applications, engines, computer-executable code, scripts, or the like. For instance, any of the program modules depicted in FIG. 5 may be implemented as software and/or firmware that includes computer-executable instructions (e.g., computer-executable program code) loadable into the memory 510 for execution by one or more of the processor(s) 508 to perform any of the techniques described herein.

Although not depicted in FIG. 5, the data storage 518 can further store various types of data utilized by program modules of the computing device 502. Such data may include, without limitation, custom functions, entity property values, or the like. Any data stored in the data storage 518 can be loaded into the memory 510 for use by the processor(s) 508 in executing computer-executable program code. In addition, any data stored in the data storage 518 can potentially be stored in one or more external datastores that are accessible via the DBMS 522 and loadable into the memory 510 for use by the processor(s) 508 in executing computer-executable instructions/program code.

The processor(s) 508 can be configured to access the memory 510 and execute computer-executable instructions/program code loaded therein. For example, the processor(s) 508 can be configured to execute computer-executable instructions/program code of the various program modules of the computing device 502 to cause or facilitate various operations to be performed in accordance with one or more embodiments of the invention. The processor(s) 508 can include any suitable processing unit capable of accepting data as input, processing the input data in accordance with stored computer-executable instructions, and generating output data. The processor(s) 508 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 can be made capable of supporting any of a variety of instruction sets.

Referring now to other illustrative components depicted as being stored in the data storage 518, the O/S 520 can be loaded from the data storage 518 into the memory 510 and can provide an interface between other application software executing on the computing device 502 and hardware resources of the computing device 502. More specifically, the O/S 520 can include a set of computer-executable instructions for managing hardware resources of the computing device 502 and for providing common services to other application programs. In certain example embodiments, the O/S 520 can include or otherwise control execution of one or more of the engines/program modules stored in the data storage 518. The O/S 520 can include any operating system now known or which can be developed in the future including, but not limited to, any server operating system, any mainframe operating system, or any other proprietary or non-proprietary operating system.

The DBMS 522 can be loaded into the memory 510 and can support functionality for accessing, retrieving, storing, and/or manipulating data stored in the memory 510, data stored in the data storage 518, and/or data stored in external datastore(s). The DBMS 522 can use any of a variety of database models (e.g., relational model, object model, etc.) and can support any of a variety of query languages. The DBMS 522 can access data represented in one or more data schemas and stored in any suitable data repository. Datastore(s) that may be accessible by the computing device 502 via the DBMS 522, can include, but are not limited to, databases (e.g., relational, object-oriented, etc.), file systems, flat files, distributed datastores in which data is stored on more than one node of a computer network, peer-to-peer network datastores, or the like. Generally speaking, the datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

Referring now to other illustrative components of the computing device 502, the input/output (I/O) interface(s) 512 can facilitate the receipt of input information by the computing device 502 from one or more I/O devices as well as the output of information from the computing device 502 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 502 or can be separate therefrom. The I/O devices can further include, for example, any number of peripheral devices such as data storage devices, printing devices, and so forth.

The I/O interface(s) 512 can also include an interface for an external peripheral device connection such as universal serial bus (USB), FireWire, Thunderbolt, Ethernet port or other connection protocol that can connect to one or more networks. The I/O interface(s) 512 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 502 can further include one or more network interfaces 514 via which the computing device 502 can communicate with any of a variety of other systems, platforms, networks, devices, and so forth. The network interface(s) 514 can enable communication, for example, one or more other devices via one or more of the network(s) 506. In example embodiments, the network interface(s) 514 provide a two-way data communication coupling to one or more network links that are connected to one or more of the network(s) 506. For example, the network interface(s) 514 may include an integrated services digital network (ISDN) card, a cable modem, a satellite modem, or a modem to provide a data communication connection to a corresponding type of telephone line. As another non-limiting example, the network interface(s) 514 may include a local area network (LAN) card to provide a data communication connection to a compatible LAN (or a wide area network (WAN) component to communicate with a WAN). Wireless links may also be implemented. In any such implementation, the network interface(s) 514 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 506 and the signals on network links and through the network interface(s) 514, which carry the digital data to and from the computing device 502, are example forms of transmission media. In example embodiments, the computing device 502 can send messages and receive data, including program code, through the network(s) 506, network links, and network interface(s) 514. For instance, in the Internet example, a server might transmit a requested code for an application program through the Internet, the ISP, a local network, and a network interface 514. The received code may be executed by a processor 508 as it is received, and/or stored in the data storage 518, or other non-volatile storage for later execution.

It should be appreciated that the program modules depicted in FIG. 5 as part of the computing device 502 are merely illustrative and not exhaustive and that processing described as being supported by any particular program module can alternatively be distributed across multiple engines, components, modules, or the like, or performed by a different engine, component, module, or the like. In addition, various program module(s), engine(s), script(s), plug-in(s), Application Programming Interface(s) (API(s)), or any other suitable computer-executable code hosted locally on the computing device 502 and/or hosted on other computing device(s) accessible via one or more of the network(s) 506, can be provided to support functionality provided by the program modules depicted in FIG. 5 and/or additional or alternate functionality. Further, functionality can be modularized in any suitable manner such that processing described as being performed by a particular program module can be performed by a collection of any number of engines, components, program modules, or the like, or functionality described as being supported by any particular program module can be supported, at least in part, by another engine, component, or program module. In addition, program modules that support functionality described herein can be executable across any number of computing devices 502 in accordance with any suitable computing model such as, for example, a client-server model, a peer-to-peer model, and so forth. In addition, any of the functionality described as being supported by any of the program modules depicted in FIG. 5 can be implemented, at least partially, in hardware and/or firmware across any number of devices or servers.

It should further be appreciated that the computing device 502 can include alternate and/or additional hardware, software, or firmware components beyond those described or depicted without departing from the scope of the invention. More particularly, it should be appreciated that software, firmware, or hardware components depicted as forming part of the computing device 502 are merely illustrative and that some components may or may not be present or additional components can be provided in various embodiments. It should further be appreciated that each of the above-mentioned program modules represents, in various embodiments, a logical partitioning of supported functionality. This logical partitioning is depicted for ease of explanation of the functionality and may or may not be representative of the structure of software, hardware, and/or firmware for implementing the functionality. Accordingly, it should be appreciated that functionality described as being provided by a particular program module can, in various embodiments, be provided at least in part by one or more other engines, components, or program modules. Further, one or more depicted program modules may or may not be present in certain embodiments, while in other embodiments, additional program modules not depicted can be present and can support at least a portion of the described functionality and/or additional functionality.

In general, the terms engine or program module, as used herein, may refer to logic embodied in hardware or firmware, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors.

Example embodiments are described herein as including logic or a number of components, program modules, engines, or mechanisms. Program modules may constitute either software modules (e.g., code embodied on a machine-readable medium) or hardware modules. A "hardware module" or "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may comprise non-volatile media and/or volatile media. A non-exhaustive list of more specific examples of the computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from with transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory, however, can operate in conjunction with transmission media. In particular, transmission media participates in transferring information between non-transitory media. For example, transmission media includes coaxial cables, copper wire and fiber optics, including the wires that comprise at least some of the bus(es) 516. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A system, comprising:
at least one processor; and
at least one memory storing computer-executable instructions, wherein the at least one processor is configured to access the at least one memory and execute the computer-executable instructions to:
identify a seed entity;
define operations on the seed entity to determine matching entities linked to the seed entity within an unstructured text, wherein the operations comprise:
a first operation, based on a first function, to output one or more first matching entities based on respective link types defining a relationship between the seed entity and the first matching entities; and
a second operation, based on a second function, to output, in addition to the first matching entities, one or more second matching entities based on a property shared between the first matching entities and the second matching entities, wherein the property shared comprises a log event, and the second operation comprises a template that defines an extent of a permitted variation of a format;
execute the first operation and the second operation;
determine any overlaps among a first output of the first operation and a second output of the second operation; and
combine the first output of the first operation and the second output of the second operation while removing the any overlaps among the first output of the first operation and the second output of the second operation in order to remove any objects within the second output of the second operation that were previously found within the first output of the first operation;
filter the first output of the first operation or the second output of the second operation based on an output type to generate a third output;
generate a visual representation, wherein the visual representation includes any results that were filtered and excluded from the third output but present in the first output or in the second output, the visual representation displaying the any results differently from the third output;
tag the one or more first matching entities and the one or more second matching entities within the unstructured text; and
execute a further workflow on the one or more first matching entities and the one or more second matching entities within the unstructured text.

2. The system of claim 1, wherein the filtering of the first output or the second output is based on an entity type or an object type.

3. The system of claim 1, wherein the respective link types indicate an ownership relationship of the first matching entities by the seed entity.

4. The system of claim 3, wherein the operations comprise:
a third operation to output one or more third matching entities based on the respective link types between the second matching entities and the third matching entities, the respective link types between the second matching entities and the third matching entities indicative of an inverse of the ownership relationship.

5. The system of claim 4, wherein the at least one processor is configured to access the at least one memory and execute the computer-executable instructions to:
filter the third matching entities based on an entity type that matches a type of the seed entity, wherein the filtered third matching entities have a same type as the seed entity.

6. The system of claim 5, wherein the at least one processor is configured to access the at least one memory and execute the computer-executable instructions to:
generate an illustration of a sequence of the operations from the seed entity to the filtered third matching entities, wherein the traversal path displays any of the third matching entities that have been filtered out.

7. The system of claim 1, wherein the respective link types are indicative of IP (Internet Protocol) log events.

8. A method, comprising:
identifying a seed entity;
defining operations on the seed entity to determine matching entities linked to the seed entity within an unstructured text, wherein the operations comprise:
 a first operation, based on a first function, to output one or more first matching entities based on respective link types defining a relationship between the seed entity and the first matching entities; and
 a second operation, based on a second function, to output, in addition to the first matching entities, one or more second matching entities based on a property shared between the first matching entities and the second matching entities, wherein the property shared comprises a log event, and the second operation comprises a template that defines an extent of a permitted variation of a format;
determining any overlaps among a first output of the first operation and a second output of the second operation;
combining the first output of the first operation and the second output of the second operation while removing the any overlaps among the first output of the first operation and the second output of the second operation in order to remove any objects within the second output of the second operation that were previously found within the first output of the first operation;
filtering the first output of the first operation or the second output of the second operation based on an output type to generate a third output;
generating a visual representation of the output, wherein the visual representation includes any results that were filtered and excluded from the third output but present in the first output or in the second output, the visual representation displaying the any results differently from the third output;
tagging the one or more first matching entities and the one or more second matching entities within the unstructured text; and
executing a further workflow on the one or more first matching entities and the one or more second matching entities within the unstructured text.

9. The method of claim 8, wherein the filtering of the first output or the second output is applied to the second matching entities and a result of the filtering comprises one or more third matching entities, the filtering being based on an entity type or an object type.

10. The method of claim 8, wherein the respective link types indicate an ownership relationship of the first matching entities by the seed entity.

11. The method of claim 10, wherein the operations comprise:
a third operation to output one or more third matching entities based on the respective link types between the second matching entities and the third matching entities, the respective link types between the second matching entities and the third matching entities indicative of an inverse of the ownership relationship.

12. The method of claim 11, further comprising:
filtering the third matching entities based on an entity type that matches a type of the seed entity, wherein the filtered third matching entities have a same type as the seed entity.

13. The method of claim 12, further comprising:
generating an illustration of a sequence of the operations from the seed entity to the filtered third matching entities, wherein the traversal path displays any of the third matching entities that have been filtered out.

14. The method of claim 8, wherein the respective link types are indicative of IP (Internet Protocol) log events.

15. A computer program product comprising a non-transitory computer-readable medium readable by a processing circuit, the non-transitory computer-readable medium storing instructions executable by the processing circuit to cause a method to be performed, the method comprising:
identifying a seed entity;
defining operations on the seed entity to determine matching entities linked to the seed entity within an unstructured text, wherein the operations comprise:
 a first operation, based on a first function, to output one or more first matching entities based on respective link types defining a relationship between the seed entity and the first matching entities; and
 a second operation, based on a second function, to output, in addition to the first matching entities, one or more second matching entities based on a property shared between the first matching entities and the second matching entities, wherein the property shared comprises a log event, and the second operation comprises a template that defines an extent of a permitted variation of a format;
determining any overlaps among a first output of the first operation and a second output of the second operation; and
combining the first output of the first operation and the second output of the second operation while removing the any overlaps among the first output of the first operation and the second output of the second operation in order to remove any objects within the second output of the second operation that were previously found within the first output of the first operation;
filtering the first output of the first operation or the second output of the second operation based on an output type to generate a third output;
generating a visual representation, wherein the visual representation includes any results that were filtered and excluded from the third output but present in the first output or in the second output, the visual representation displaying the any results differently from the third output;
tagging the one or more first matching entities and the one or more second matching entities within the unstructured text; and
executing a further workflow on the one or more first matching entities and the one or more second matching entities within the unstructured text.

16. The computer program product of claim 15, wherein the filtering of the output is applied to the second matching entities and a result of the filtering comprises one or more third matching entities, the filtering being based on an entity type or an object type.

17. The computer program product of claim 15, wherein the respective link types indicate an ownership relationship of the first matching entities by the seed entity.

18. The computer program product of claim 17, wherein the operations comprise:
   a third operation to output one or more third matching entities based on the respective link types between the second matching entities and the third matching entities, the respective link types between the second matching entities and the third matching entities indicative of an inverse of the ownership relationship.

19. The computer program product of claim 18, wherein the method further comprises:
   filtering the third matching entities based on an entity type that matches a type of the seed entity, wherein the filtered third matching entities have a same type as the seed entity.

* * * * *